United States Patent
Geurts et al.

(10) Patent No.: US 10,399,422 B2
(45) Date of Patent: Sep. 3, 2019

(54) WIND DEFLECTOR ASSEMBLY

(71) Applicant: INALFA ROOF SYSTEMS GROUP B.V., Oostrum (NL)

(72) Inventors: Ruud Geurts, Helden (NL); Peter Christiaan Leonardus Johannes Manders, Horst (NL); Eduardus Christianus Henricus Van Boxtel, Zeeland (NL); Suyanto Teri Wahiyu Ten-Jet-Foei, Helmond (NL); Robert Rikkert, Nuenen (NL)

(73) Assignee: INALFA ROOF SYSTEMS GROUPS B.V., Oostrum (NL)

( * ) Notice: Subject to any disclaimer, the term of this patent is extended or adjusted under 35 U.S.C. 154(b) by 0 days.

(21) Appl. No.: 15/854,399

(22) Filed: Dec. 26, 2017

(65) Prior Publication Data
US 2018/0186223 A1 Jul. 5, 2018

(30) Foreign Application Priority Data
Dec. 29, 2016 (EP) .................................... 16207376

(51) Int. Cl.
*B60J 7/22* (2006.01)
(52) U.S. Cl.
CPC ....................... *B60J 7/22* (2013.01)
(58) Field of Classification Search
CPC ........................................................ B60J 7/22

USPC ............................................................ 296/217
See application file for complete search history.

(56) References Cited

U.S. PATENT DOCUMENTS

| 4,482,183 | A | * | 11/1984 | Grimm | ...................... | B60J 7/22 |
| | | | | | | 296/217 |
| 7,533,928 | B2 | | 5/2009 | Biewer et al. | | |
| 9,186,971 | B1 | * | 11/2015 | Lee | ............................. | B60J 7/22 |
| 2012/0313401 | A1 | * | 12/2012 | Luecke | .................. | B60J 7/0046 |
| | | | | | | 296/217 |

FOREIGN PATENT DOCUMENTS

DE 102009009465 * 8/2010
EP 1844969 B1 6/2010

* cited by examiner

*Primary Examiner* — Dennis H Pedder
(74) *Attorney, Agent, or Firm* — Steven M. Koehler; Westman, Champlin & Koehler, P.A.

(57) ABSTRACT

A wind deflector assembly includes a wind deflector member which extends in a transverse direction of the vehicle and is movable between a retracted position and an extended position. The wind deflector member is connected to a first end of at least one pivotable wind deflector arm of which an opposite second end is at least pivotally connected to a stationary part. A biasing device engages the wind deflector arm and urges the wind deflector arm towards the extended position. The biasing device is at least pivotally connected to the stationary part through a pivot.

20 Claims, 9 Drawing Sheets

WIND DEFLECTOR ASSEMBLY

BACKGROUND

The discussion below is merely provided for general background information and is not intended to be used as an aid in determining the scope of the claimed subject matter.

Aspects of the invention relate to a wind deflector assembly intended for use in front of a roof opening of an open roof construction for a vehicle.

A state of the art wind deflector assembly and comprises two pivotable wind deflector arms at opposite transverse sides of the roof opening which at free ends are connected by a wind deflector beam. A mesh material extends between said wind deflector beam and a stationary part of the vehicle and, in the extended position, is capable of creating a turbulent flow pattern above the roof opening for reducing wind noise such as booming. In a retracted position the wind deflector arms are pivoted inwardly and the wind deflector beam and mesh material are housed/retracted within the outer contour of the vehicle roof. The biasing device of the wind deflector assembly comprises a spring loaded lever pivotally connected to the stationary part and to the wind deflector arm.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A wind deflector assembly, intended for use in front of a roof opening of an open roof construction for a vehicle, includes a wind deflector member which extends in a transverse direction of the vehicle and which is movable between a retracted position and an extended position. The wind deflector member is connected to a first end of at least one pivotable wind deflector arm of which an opposite second end is at least pivotally connected to a stationary part. A biasing device engages the wind deflector arm and is urging the wind deflector arm towards the extended position. The biasing device is at least pivotally connected to the stationary part through a pivot. The biasing device includes at least a first and second leg connected to each other at a connection, at least the first leg loading the wind deflector arm towards the extended position and the second leg of the biasing device being attached to the wind deflector arm. The pivot is positioned near the connection between the first and second leg. Due to this two-leg pivotable biasing device there is provided a stable support for the wind deflector arm or arms so that the wind deflector can maintain its position also at (very) high speeds of the vehicle.

Preferably, the biasing device comprises a bent leaf spring, which is a very simple but effective spring member for the biasing device.

The biasing device may comprise a third leg connected to the end of the second leg away from the pivot, the third leg being fixed to the wind deflector arm, the first, second and third leg forming part of an integral (e.g. formed from a single unitary body) leaf spring, the angle between the second and third legs decreasing and therefore the spring force increases when the wind deflector arm is moved from the extended position towards the retracted position.

With this type of biasing device, the spring force is effected at least for a part both by the bend between the first and second and by the bend between the second and third leg.

The leaf spring may be bent around a bearing of the pivot in order to create a simple connection between the spring and the pivot. The bearing and/or pivot pin may be made from plastic and one of them may be molded to the leaf spring or other spring member.

In the three-leg embodiment, the end of the first leg of the biasing device may be slidably engaging the third leg thereof, the end of the first leg being preferably rounded. In this way wear is minimized as the rounded end of the first leg, normally made of spring steel, slides against the third leg made of the same material. If there is no third leg, measures should be taken in the wind deflector arm to provide a hard sliding surface, e.g. by a steel insert, as the wind deflector arm is normally made from a softer material like plastic or aluminium.

The second leg of the biasing device could also be pivotally connected to the wind deflector arm, for example if the second leg of the biasing device is rigid, e.g. comprising a lever connected to the first leg through a bent extension thereof.

In a preferred embodiment, the biasing device is positioned and configured such that when the wind deflector arm moves the wind deflector member from the retracted position to the extended position the biasing device moves from an unlocked biasing position to a locked position in which it locks the wind deflector arm in its extended position, the closure being figured to move the biasing device back towards the unlocked biasing position.

Such locked biasing device causes maximum support for the wind deflector arm as the support is more or less by a rigidly behaving member, instead of by a bendable member. This is very favourable for example at very high speeds of the vehicle where the forces on the wind deflector are high.

Such locked position of the first leg may be guaranteed if the wind deflector arm is provided with a stop for the first leg of the biasing device, stopping the first leg in its locked position.

The closure (also covering any part moving with it) may engage the biasing device directly to move it to the unlocked biasing position, or may engage the wind deflector arm which causes the biasing device to move.

For example, the closure is provided with a closure part near its front end configured to engage the biasing device, in particular the upper end of the first leg, when it is moving to the closed position in order to move the biasing device towards the unlocked biasing position.

If the wind deflector arm is not only pivotable but also slidable with respect to the stationary part, the closure part may also push the wind deflector arm forwardly to thereby move the first leg of the biasing device to its unlocked biasing position.

BRIEF DESCRIPTION OF THE DRAWINGS

Hereinafter, aspects of the invention will be further elucidated while referring to the drawings, in which.

DETAILED DESCRIPTION OF THE DRAWINGS

Figure 1:
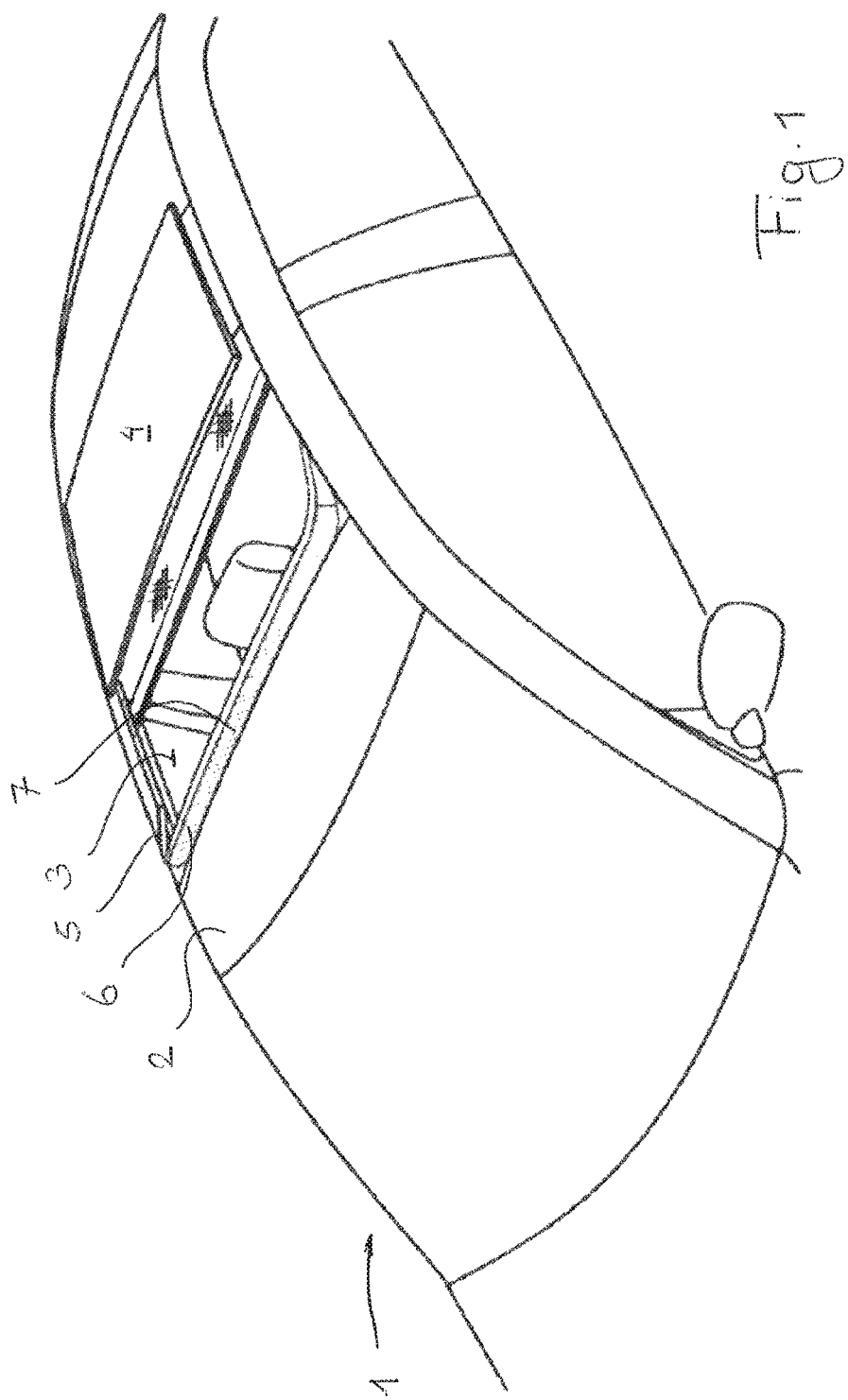
FIG. 1 is a schematic perspective view of a vehicle roof having an open roof construction comprising the wind deflector assembly.
Figure 2:
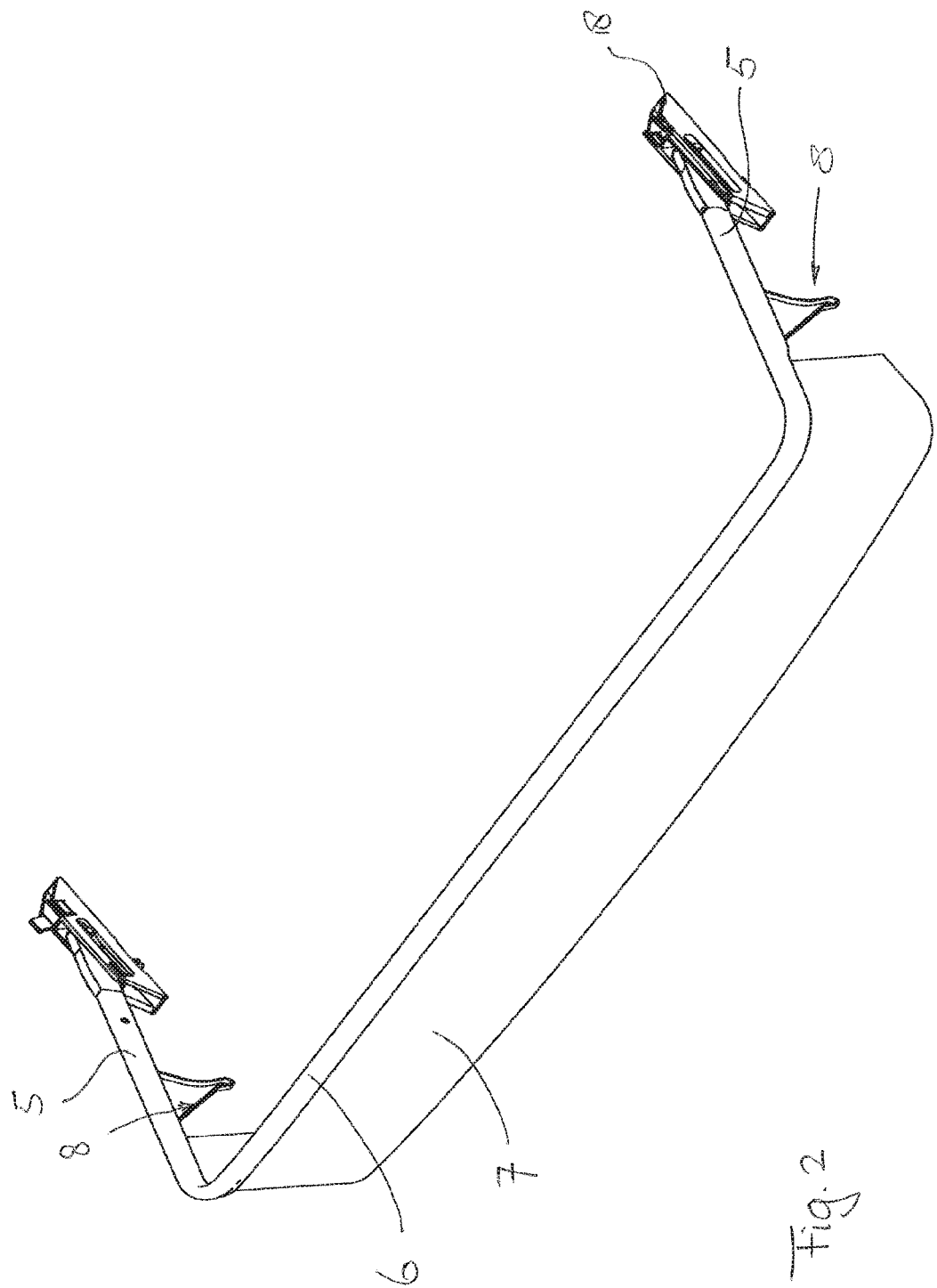
FIG. 2 is a perspective view of a first embodiment of the wind deflector assembly.

Firstly referring to FIGS. 1 and 2, a wind deflector assembly is schematically illustrated. In a stationary roof part 2 of a vehicle 1 a roof opening 3 is defined which can be opened and closed by a movable closure, here a rigid, at least partly transparent panel 4, made of glass, plastic or the like. For influencing the flow pattern above the roof opening 3 when panel 4 is moved rearwardly above or below stationary roof part 2 (and thus for reducing disturbing noises and for preventing excessive wind entrance into the vehicle) in front of the roof opening 3 a wind deflector assembly is positioned which extends in a transverse direction of the vehicle 1 and which is movable between a retracted position substantially below the stationary roof part 2 and an extended position extending at least partly above the stationary roof part in front of the roof opening 3.

The wind deflector assembly comprises two pivotable wind deflector arms 5 connected by a transverse wind deflector member, here a wind deflector beam 6. A flexible, in particular mesh material 7 may extend between the wind deflector beam 6 and a stationary part of the vehicle 1. In the illustrated extended position the mesh material 7 is tensioned and air can flow through it, yielding a substantially turbulent flow pattern above the roof opening 3.

FIG. 2 schematically shows that each wind deflector arm is provided with a biasing device 8 to bias wind deflector arm 5 and therefore wind deflector beam 6 towards the extended upper position.

Figure 3:
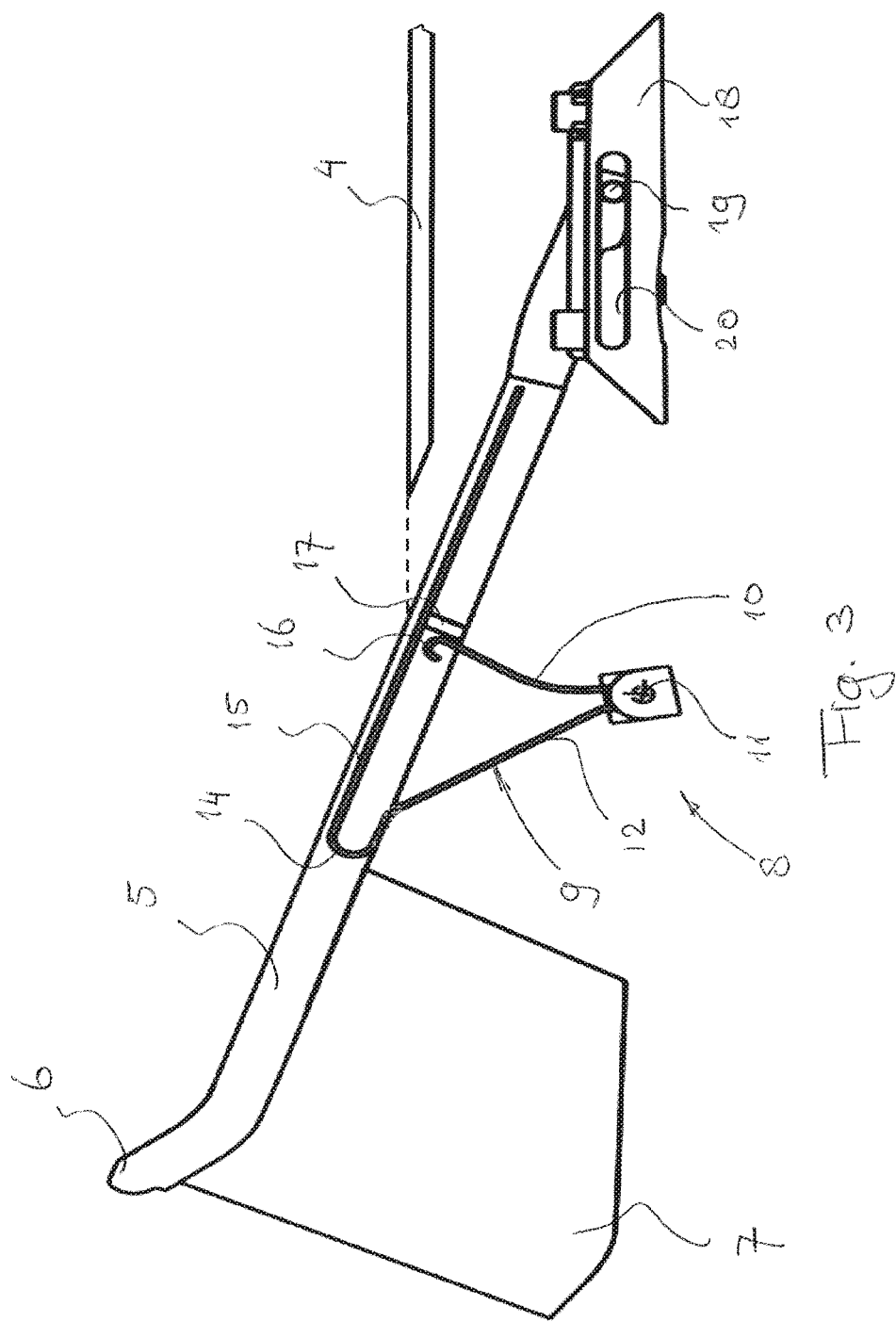
FIGS. 3, 4 are schematic side elevational views of the first embodiment of the wind deflector assembly according to the invention in an extended position, and in a partially retracted position.
Figure 4:
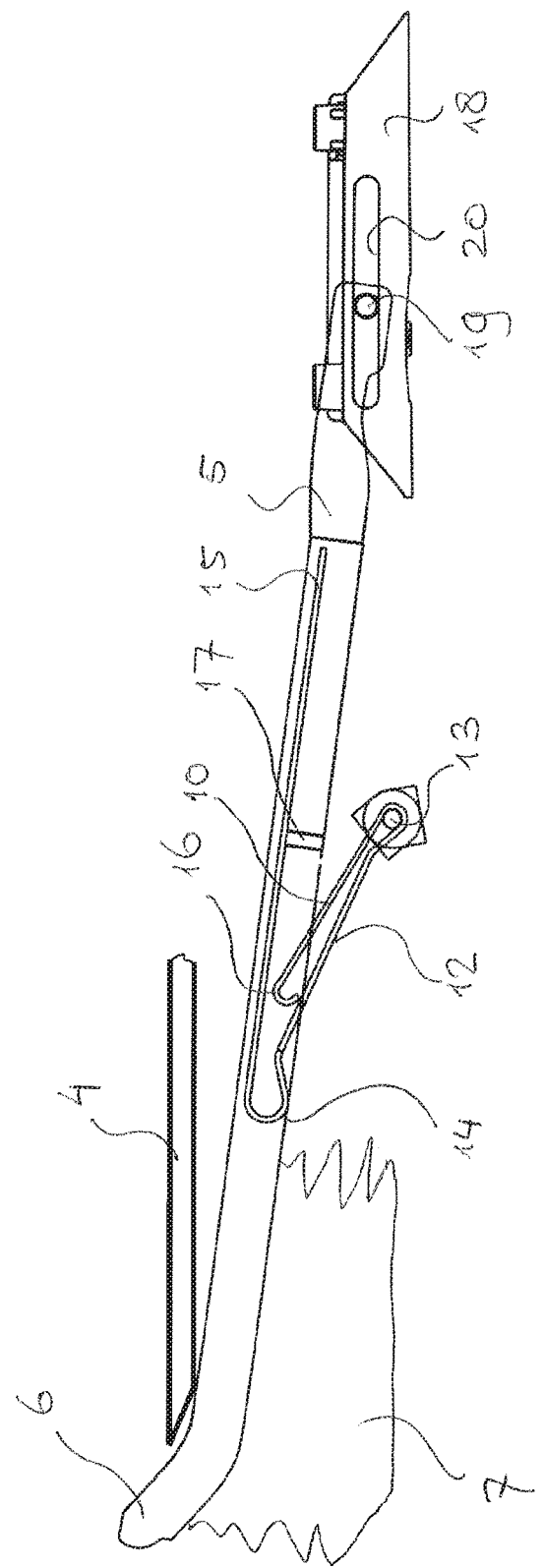

FIGS. 2, 3 and 4 show a first embodiment of such biasing device 8. In this embodiment, biasing device 8 comprises a single piece spring member 9, configured as a bent leaf spring. The leaf spring 9 includes a first leg 10, extending between wind deflector arm 5 and a pivot 11 on a stationary part of the open roof construction (not shown, but this can be a well-known frame for example), a second leg 12 connected to the first leg 10 through a bend 13 near pivot 11 and connected to the wind deflector arm 5 at its other end away from pivot 11. The connection of second leg 12 to wind deflector arm 5 is effected by a bend 14 connecting second leg 12 to a third leg 15 fixed to wind deflector arm 5 and extending lengthwise thereof.

The free end of first leg 10 away from pivot 11 is not fixed to the wind deflector arm 5, but is slidingly engaging the third leg 15 (although shown in the drawing with a gap) and is provided for this purpose with a rounded end 16. This rounded end 16 can easily slide along the lower side of the third leg 15. The wind deflector arm 5 is provided with a stop 17 against which the upper end 16 of the first leg 10 of spring member 9 rests when the wind deflector arm 5 and beam 6 are in their upper, extended position. In this fully extended position, the first leg 10 of spring member 9 has such orientation with respect to wind deflector arm 5 that it is in a dead center or just beyond a dead center position, such that the first leg 10 is locked in its position, so that it provides a very stable support. The first leg is sufficiently rigid to hardly bend if it is loaded along its axis. The wind deflector arm can thus not return to the lower, retracted position.

To return to the retracted position, in this embodiment, the wind deflector arm 5 comprises at its lower, rear end remote from the wind deflector beam 6 not only a pivoting, but also a sliding connection to a stationary part 18 of the open roof construction. This pivoting and sliding connection includes a transverse pin 19 protruding to both sides of the wind deflector 5 and each engaging a longitudinal slot 20 in the stationary part 18. In the upper extended position, the pin 19 is at or near the rear end of slot 20. When panel 4 (FIG. 1) arrives near its front position, a closure part at the front of panel 4 (shown schematically here) or another part moving along with panel 4 engages each wind deflector arm 5 and is able to push it forwardly due to the pin 19 engaging slot 20. Stop 17 pushes free end 16 of first leg 10 of spring member 9 forwardly beyond its dead center so that wind deflector arm 5 is then able to push spring member 9 of biasing device downwardly against the spring force when the closure part pushes further on wind deflector arm 5. The closure part of panel 4 will engage the wind deflector arm at the position of stop 17 or more towards pivot pin 19.

The spring force of spring member 9 is mainly coming from bends 13, 14 and from first leg 10 which is bent to a straighter shape, while the angle between first and second legs 10, 12 and between the second and third legs 12, 15 decreases when wind deflector arm 5 moves from the extended to the retracted position. This is shown by a comparison of FIGS. 3 and 4. It is also shown in these figures that spring member 9 as a whole pivots around pivot 11.

Figure 5:
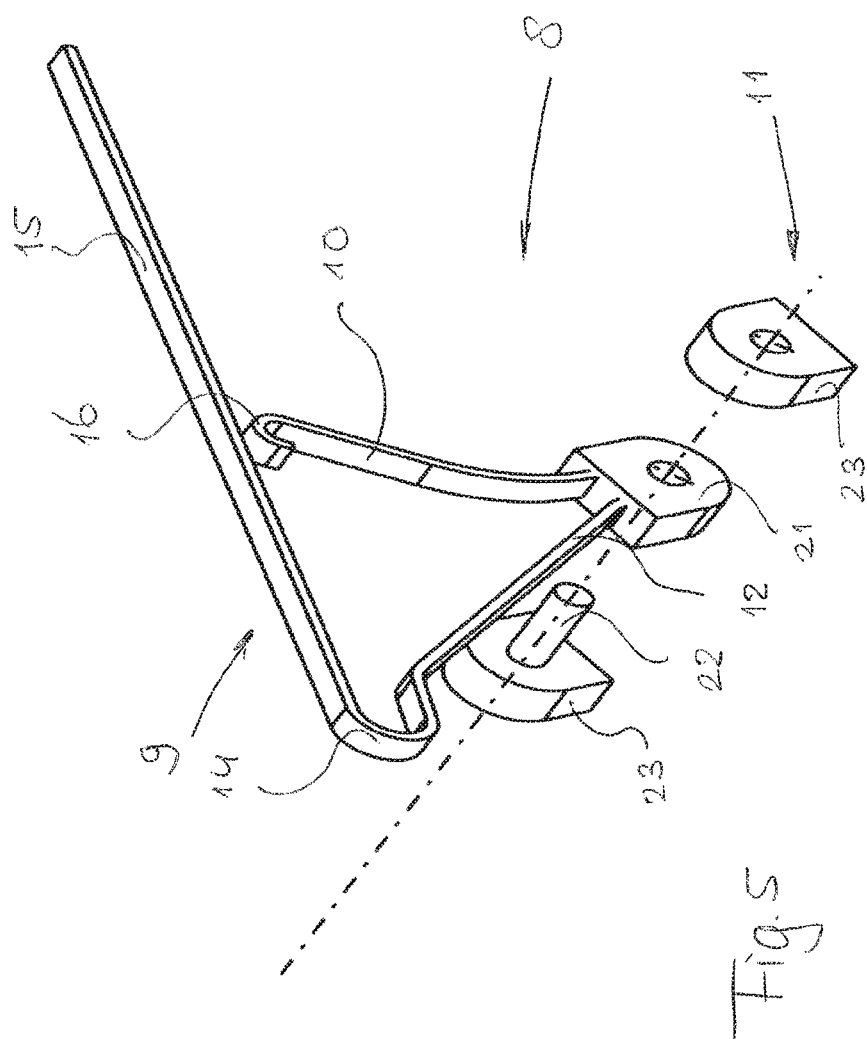
FIG. 5 is an enlarged exploded view of the biasing device of the wind deflector assembly of FIGS. 3 and 4.

FIG. 5 shows the structure of pivot 11. It is shown that spring member 9 has a bearing 21 molded to it. Bearing has a hole in which pivot pin 22 fits. Pivot pin 22 is supported by supports 23 attached to the stationary part (not shown). These parts 21-23 may be made from plastic, e.g. by injection molding. It is of course also possible that pivot pin 22 is molded to spring member 9.

Figure 6:
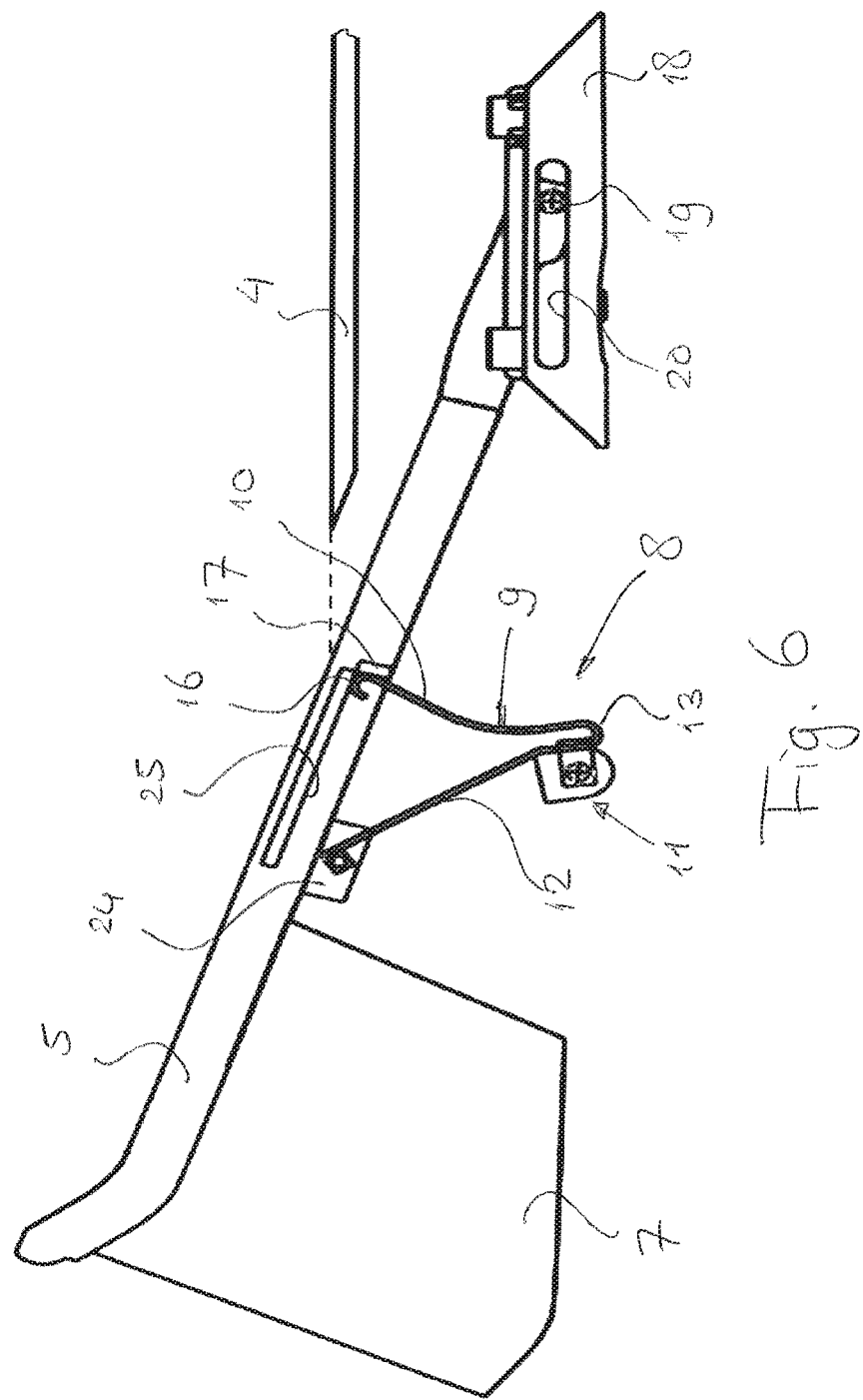
FIGS. 6-9 are views corresponding to that of FIG. 3 but showing further embodiments of the wind deflector assembly in the extended position.

FIG. 6 shows another embodiment of the wind deflector assembly. In this embodiment, spring member 9 of biasing device 8 only has two legs 10, 12. The end of second leg 12 remote from pivot 11 is pivotally attached to a mount 24 of wind deflector arm 5. This second leg 12 may or may not be rigid in this embodiment. Rounded end 16 of first leg 10 of spring member 9 is now engaging a wear resistant sliding surface 25 extending longitudinally of wind deflector arm 5. The steel surface is e.g. part of a steel insert molded in the plastic wind deflector arm. In this embodiment, pivot 11 is positioned outside bend 13 between first and second legs 10, 12. Spring member 9 is still made from a single leaf spring.

Figure 7:
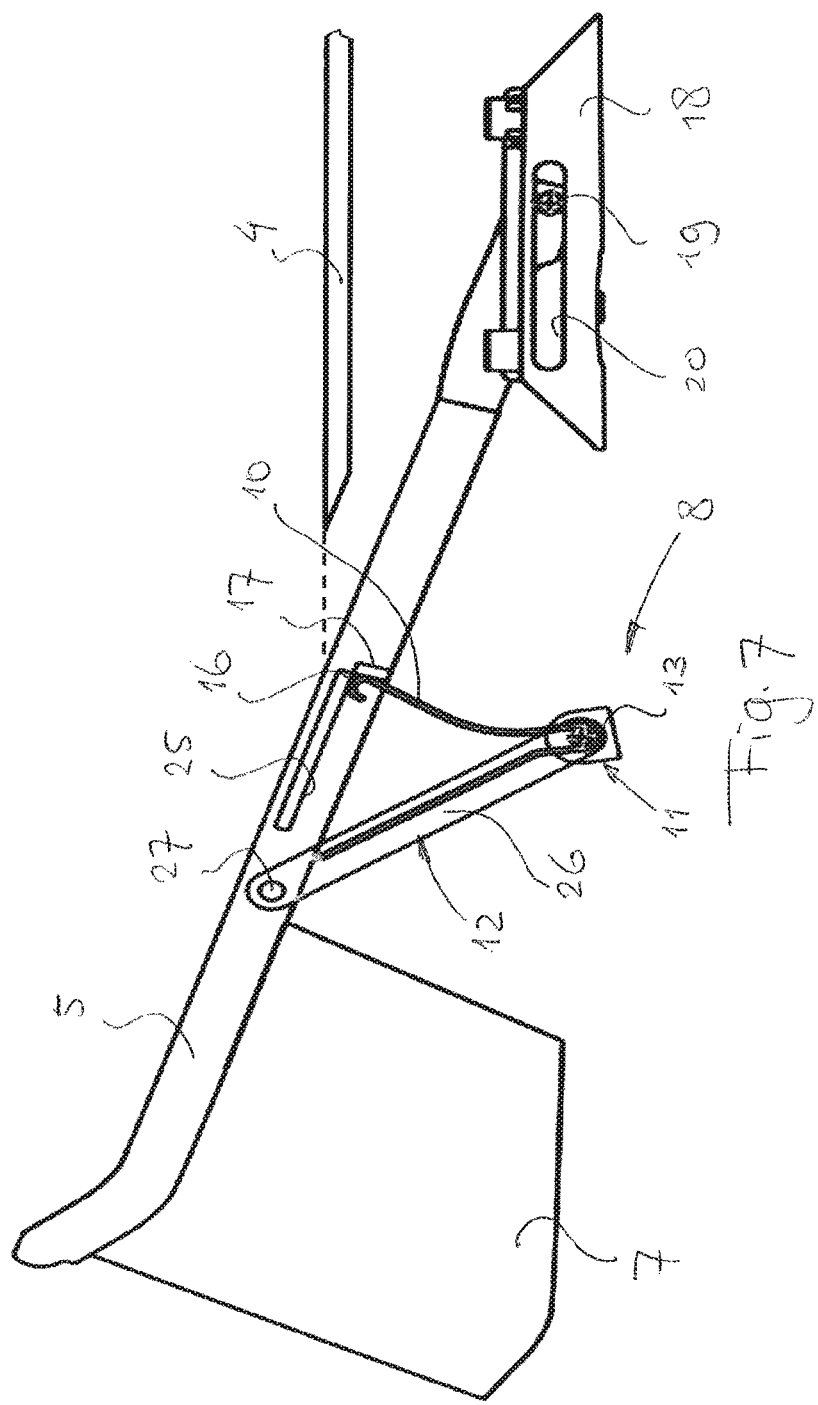

In the embodiment of FIG. 7, second leg 12 is now formed by a separate lever 26 attached to an extension of first leg 10 of spring member 9 beyond bend 13. Lever 26 is pivotally attached to wind deflector arm 5 through pin 27.

Figure 8:
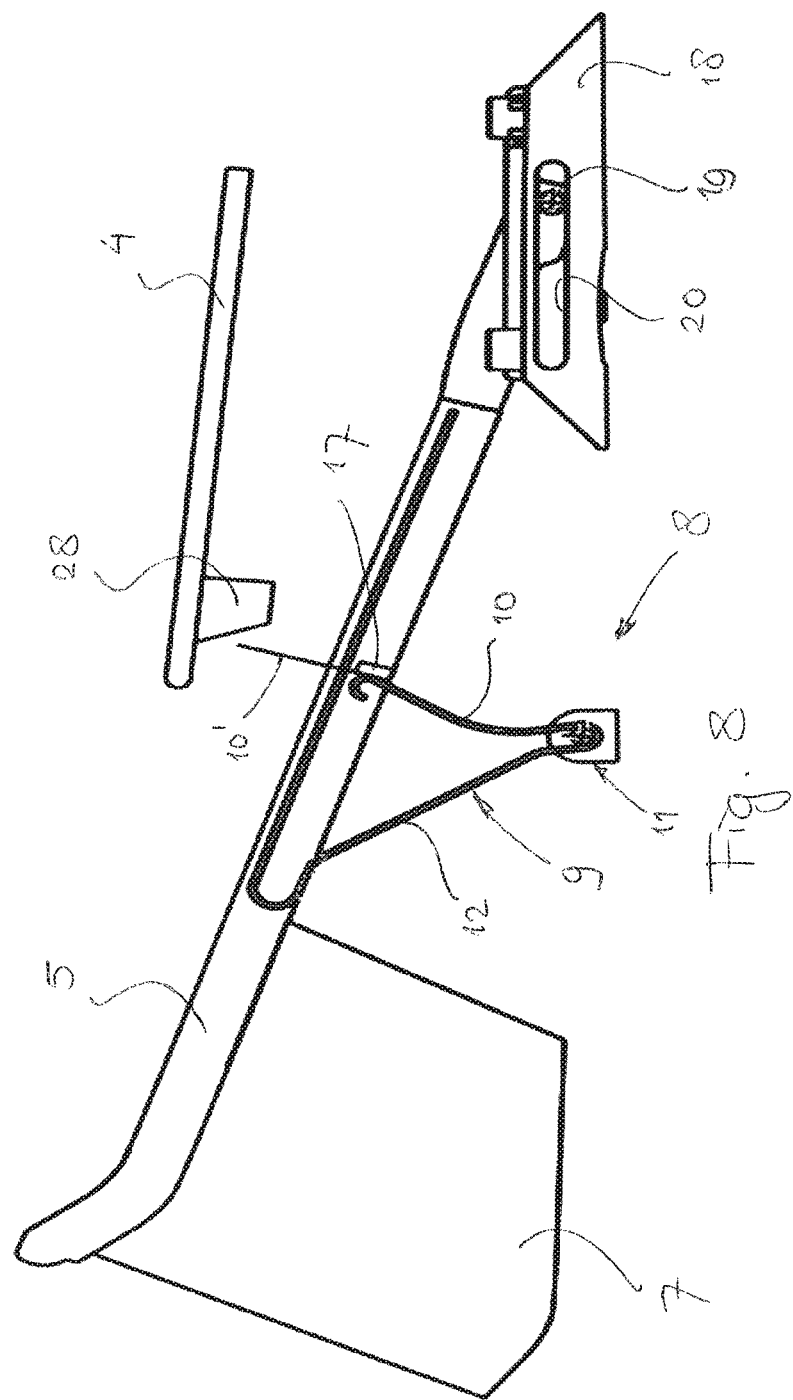

FIG. 8 shows a variation of the embodiment of FIGS. 3, 4. Biasing device 8 is similar, but closure part 28 cooperating with wind deflector arm 5 comes first in engagement with an extension 10' of first leg 10 of spring member 9 so that this closure part 28 moves first leg 10 in forward direction when closure panel 4 arrives near its front position in order to move first leg 10 beyond its dead center so that upon a further forward movement of panel 4, closure part 28 may engage wind deflector arm 5 to push it down to its retracted position.

Figure 9:
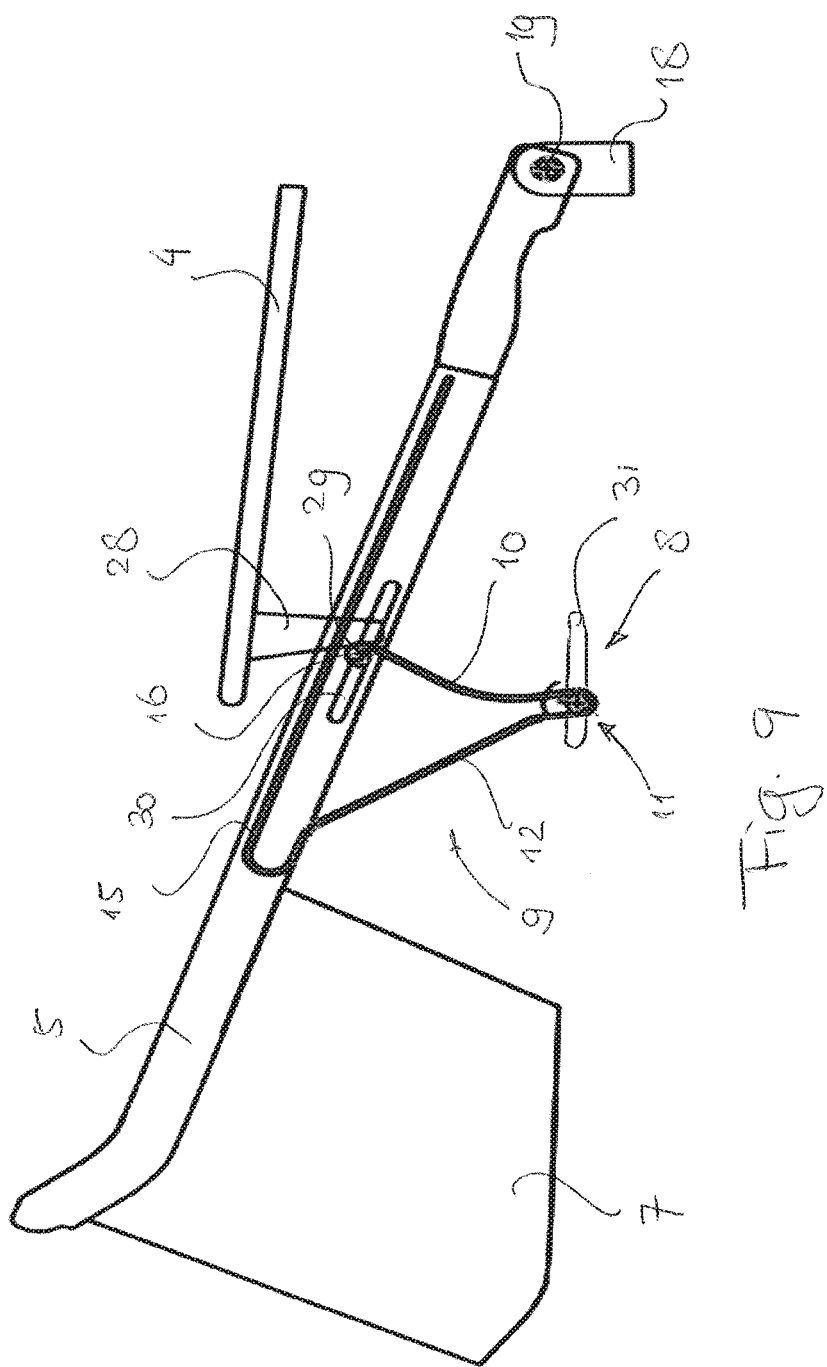

FIG. 9 shows a variation of the embodiment of FIG. 7. Rounded end 16 of first leg 10 of spring member 9 is now provided with a transverse pin 29 cooperating with an extended closure part 28 to move first leg 10 beyond its dead center. This pin is also used to allow movement between rounded end 16 of first leg 10 and wind deflector arm 5, that is by having this pin 29 engage a slot 30 in wind deflector arm 5. Another difference in this embodiment is that lower rear end of wind deflector arm 5 is now only pivotally connected to stationary part 18. In order to compensate for the difference in length of second leg 12 and wind deflector arm 5 and the different positions of pivots 11 and 27, pivot 11 is now slidable in a slot 31 of the stationary part.

It is noted that the wind deflector assemblies generally will comprise a separate wind deflector arm 5 at each transverse side of the wind deflector beam 6. This means that the parts described in the above then will be provided at both sides of the assemblies, but generally in mirror-image.

From the above it becomes clear that the invention provides a wind deflector assembly and an open roof construction comprising such wind deflector assembly in which the biasing devices provides a very stable support for the wind deflector arm. The legs of the biasing device and the wind deflector arm form a triangular support resting on a stable pivot. Both legs may load the wind deflector arm, the first leg may lock the wind deflector arm in its extended position to provide maximum support, the second leg is attached to the wind deflector arm to add stability.

The invention is not limited to the embodiments described before which may be varied widely within the scope of the invention as defined by the appended claims. In principle, it would be possible that the second leg is pivotally and slidably connected to the wind deflector arm if the pivot of the wind deflector arm and of the biasing device are not slidable. The closure part engaging the wind deflector arm may either be attached directly to the closure, or may be moving with it, for example if it is attached to the operating mechanism for the closure. The closure may also include e.g. a foldable cover, slats or a non-transparent panel. The wind deflector member may also be of a panel-like structure or the like.

The invention claimed is:

1. A wind deflector assembly configured for use in front of a roof opening of an open roof construction for a vehicle, comprising:
    a stationary part;
    at least one pivotable wind deflector arm having a first end and a second end, the second end at least pivotally connected to the stationary part;
    a wind deflector member configured to extend in a transverse direction of the vehicle and which is movable between a retracted position and an extended position, which the wind deflector member is connected to the first end of said at least one pivotable wind deflector arm;
    a biasing device engaging the wind deflector arm and configured to urge the wind deflector arm towards the extended position, the biasing device being at least pivotally connected to the stationary part through a pivot, wherein the biasing device comprises at least a first and second leg connected to each other at a connection, at least the first leg configured to load the wind deflector arm towards the extended position and the second leg of the biasing device being attached to the wind deflector arm, the pivot being positioned near the connection between the first and second leg, wherein the biasing device comprises a bent leaf spring.

2. The wind deflector assembly according to claim 1, wherein the first and second leg of the biasing device define an angle between them, and the biasing device being positioned such that the angle decreases and therefore the spring force increases when the wind deflector arm is moved from the extended position towards the retracted position.

3. The wind deflector assembly according to claim 1, wherein the biasing device comprises a third leg connected to an end of the second leg away from the pivot, the third leg being fixed to the wind deflector arm, the first, second and third leg forming part of an integral leaf spring, an angle between the second and third legs decreasing and therefore the spring force increases when the wind deflector arm is moved from the extended position towards the retracted position.

4. The wind deflector assembly according to claim 1, wherein the pivot includes a bearing, and the leaf spring is bent around the bearing of the pivot.

5. The wind deflector assembly according to claim 3, wherein an end of the first leg of the biasing device is slidingly engaging the third leg.

6. The wind deflector assembly according to claim 1, wherein the second leg of the biasing device is pivotally connected to the wind deflector arm.

7. The wind deflector assembly according to claim 6, wherein the second leg of the biasing device is rigid.

8. The wind deflector assembly according to claim 7, wherein the second leg comprises a lever connected to the first leg through a bent extension of the first leg.

9. The wind deflector assembly according to claim 1, wherein the second leg is connected to the pivot through a mounting member.

10. The wind deflector assembly according to claim 1, wherein the biasing device is positioned and configured such that when the wind deflector arm moves the wind deflector member from the retracted position to the extended position the biasing device moves from an unlocked biasing position to a locked position in which the biasing device locks the wind deflector arm in its extended position, the biasing device being configured to be moved by a closure for a roof opening in the vehicle back towards the unlocked biasing position.

11. The wind deflector assembly according to claim 10, wherein the wind deflector arm is provided with a stop for the first leg of the biasing device, the stop being configured to stop the biasing device in the locked position.

12. A wind deflector assembly configured for use in front of a roof opening of an open roof construction for a vehicle, comprising:
    a stationary part;
    at least one pivotable wind deflector arm having a first end and a second end, the second end at least pivotally connected to the stationary part;
    a wind deflector member configured to extend in a transverse direction of the vehicle and which is movable between a retracted position and an extended position, which wind deflector member is connected to the first end of said at least one pivotable wind deflector arm;
    a biasing device engaging the wind deflector arm and configured to urge the wind deflector arm towards the extended position, the biasing device being at least pivotally connected to the stationary part through a pivot, wherein the biasing device comprises at least a first and second leg connected to each other at a connection, at least the first leg configured to load the wind deflector arm towards the extended position and the second leg of the biasing device being attached to the wind deflector arm, the pivot being positioned near the connection between the first and second leg; and wherein the second end of the wind deflector arm and the pivot are slidable with respect to each other.

13. The wind deflector assembly of claim 12 wherein the second end of the wind deflector arm is slidably connected to the stationary part.

14. The wind deflector assembly of claim 5 wherein the end of the first leg is rounded.

15. A wind deflector assembly configured for use in front of a roof opening of an open roof construction for a vehicle having a closure for selectively opening and closing the roof opening, comprising:
a stationary part;
at least one pivotable wind deflector arm having a first end and a second end, the second end being configured to be pivotally connected to the vehicle;
a wind deflector member which extends in a transverse direction of the vehicle and which is movable between a retracted position when the closure is in its closed position and an extended position when the closure is in an open position, which wind deflector member is connected to the first end of said at least one pivotable wind deflector arm
a biasing device configured to support the wind deflector arm and urge the wind deflector arm towards the extended position, wherein the biasing device is positioned and configured such that when the wind deflector arm moves the wind deflector member from the retracted position to the extended position the biasing device moves from an unlocked biasing position to a locked position in which it locks the wind deflector arm in its extended position, the biasing device being configured to be moved by the closure back towards the unlocked biasing position, wherein the biasing device includes a spring member forming at least a part of a leaf spring and the wind deflector arm being provided with a fixed stop, wherein a portion of the biasing device is configured to engage with the fixed stop when the biasing device is in the locked position and wherein the portion of the biasing device is configured to be completely separated from the fixed stop when the biasing device is in the unlocked biasing position.

16. The wind deflector assembly according to claim 15, wherein the closure is provided with a closure part near a front end of the closure is configured to engage with the biasing device when said closure is moving to the closed position in order to move the biasing device towards the unlocked biasing position.

17. The wind deflector assembly according to claim 16, wherein the closure part near the front end of the closure comprises a protrusion.

18. The wind deflector assembly according to claim 15, wherein the biasing device comprises at least a first and second leg connected to each other at a connection, at least the first leg configured to load the wind deflector arm towards the extended position and the second leg of the biasing device being attached to the wind deflector arm.

19. The wind deflector assembly according to claim 18, wherein the biasing device further comprises a third leg connected to an end of the second leg and away from the connection, the third leg being fixed to the wind deflector arm, the first, second and third legs forming part of the leaf spring, an angle between the second and third legs decreasing and therefore the spring force increases when the wind deflector arm is moved from the extended position towards the retracted position.

20. The wind deflector assembly according to claim 19, wherein an end of the first leg of the biasing device is slidingly engaging the third leg.

* * * * *